(12) United States Patent  (10) Patent No.: US 6,561,224 B1
Cho  (45) Date of Patent: May 13, 2003

(54) MICROFLUIDIC VALVE AND SYSTEM THEREFOR

(75) Inventor: Steven T. Cho, Castroville, CA (US)

(73) Assignee: Abbott Laboratories, Abbott Park, IL (US)

( * ) Notice: Subject to any disclaimer, the term of this patent is extended or adjusted under 35 U.S.C. 154(b) by 0 days.

(21) Appl. No.: 10/075,416

(22) Filed: Feb. 14, 2002

(51) Int. Cl.$^7$ ................................................ F15C 1/04
(52) U.S. Cl. .................. 137/831; 137/827; 251/129.06; 251/331; 251/368
(58) Field of Search ................................ 137/827, 831; 251/129.06, 368, 331

(56) References Cited

U.S. PATENT DOCUMENTS

| | | | |
|---|---|---|---|
| 4,417,786 A | 11/1983 | Beni et al. .................. 350/359 |
| 5,065,978 A | * 11/1991 | Albarda et al. ............. 257/419 |
| 5,082,242 A | * 1/1992 | Bonne et al. ............... 251/331 |
| 5,271,724 A | * 12/1993 | Lintel ....................... 417/413.2 |
| 5,323,999 A | * 6/1994 | Bonne et al. .................. 251/11 |
| 5,452,878 A | * 9/1995 | Gravesen et al. ....... 251/129.02 |
| 5,810,325 A | * 9/1998 | Carr ........................ 251/30.02 |
| 5,962,081 A | 10/1999 | Ohman et al. .............. 427/534 |
| 5,971,355 A | 10/1999 | Bieglesen et al. ..... 251/129.06 |
| 5,996,964 A | * 12/1999 | Ben-Shalom .................. 251/4 |
| 6,056,269 A | 5/2000 | Johnson et al. ............. 251/331 |
| 6,073,482 A | 6/2000 | Moles ....................... 251/61.1 |
| 6,048,734 A | 8/2000 | Burns et al. ................ 422/100 |
| 6,098,661 A | * 8/2000 | Yim et al. .................. 137/875 |
| 6,106,245 A | 8/2000 | Cabuz ....................... 417/322 |
| 6,109,889 A | 8/2000 | Zengerle et al. ......... 417/413.3 |
| 6,126,140 A | 10/2000 | Johnson et al. ........ 251/129.01 |
| 6,136,212 A | 10/2000 | Mastrangelo et al. |
| 6,143,248 A | 11/2000 | Kellogg et al. |
| 6,227,809 B1 | 5/2001 | Forster et al. ................ 417/53 |
| 6,227,824 B1 | 5/2001 | Stehr ......................... 417/540 |
| 6,265,758 B1 | 7/2001 | Takahashi .................... 257/637 |

OTHER PUBLICATIONS

Beni et al., "Dynamics of Electrowetting Displays", *J. Appl. Phys.* 52(10), 6011–6015 (1981).
Gardner, "MicroSensors: Principles and Applications", 167–169 (1994).
Matsumoto et al., "Preliminary Investigation of Micropumping Based on Electrical Control of Interfacial Tensions", *Department of Mechanical Engineering at Northwestern University*, 105–110 (1990).

* cited by examiner

Primary Examiner—A. Michael Chambers
(74) Attorney, Agent, or Firm—Michael R. Crabb

(57) ABSTRACT

A valve (105) controls fluid flow in a microfluidic system (100). The valve (105) has an input port adapted to receive fluid exerting a predetermined level of pressure on the valve (105) and an output port. The valve (105) has a variable sized aperture disposed perpendicular to the flow of the fluid (119). The aperture varies in size between a relatively small aperture (137) and a relatively large aperture (151). The small aperture (137) prevents the flow of the fluid (119) through the valve (105) responsive to a relatively high level of capillary forces between the fluid (119) and the valve (105) in the small aperture (137). The large aperture (151) permits the flow of the fluid (119) through the valve (105) responsive to a relatively low level of capillary forces between the fluid (119) and the valve (105) in the large aperture (151).

8 Claims, 6 Drawing Sheets

MICROFLUIDIC VALVE AND SYSTEM THEREFOR

FIELD OF THE INVENTION

The present invention generally relates to micro-electro-mechanical system (MEMS) technology suitable for the fabrication of microfluidic systems. More particularly, the present invention relates to a microfluidic valve for controlling fluid flow in a microfluidic system. The microfluidic valve includes a diaphragm controlled to move between a first position to provide a small aperture and a second position to provide a large aperture. The small aperture prevents fluid flow through the valve due to increased capillary and entry resistance forces between the fluid and the valve in the small aperture. The large aperture permits fluid flow through the valve due to reduced capillary forces between the fluid and the valve in the large aperture.

BACKGROUND OF THE INVENTION

MEMS technology integrates electrical components and mechanical components on a common silicon substrate by using microfabrication technology. Integrated circuit (IC) fabrication processes, such as photolithography processes and other microelectronic processes, form the electrical components. The IC fabrication processes typically use materials such as silicon, glass, and polymers. Micromachining processes, compatible with the IC processes, selectively etch away areas of the IC or add new structural layers to the IC to form the mechanical components. The integration of silicon-based microelectronics with micromachining technology permits complete electro-mechanical systems to be fabricated on a single chip. Such single chip systems integrate the computational ability of microelectronics with the mechanical sensing and control capabilities of micromachining to provide smart devices.

One type of MEMS is a microfluidic system. Microfluidic systems include components such as channels, reservoirs, mixers, pumps, valves, chambers, cavities, reaction chambers, heaters, fluidic interconnects, diffusers, nozzles, and other microfluidic components. These microfluidic components typically have dimensions between a few micrometers and a few hundreds of micrometers. These small dimensions minimize the physical size, the power consumption, the response time and the waste of the microfluidic system. Such microfluidic systems may provide wearable miniature devices located either outside or inside the human body.

Applications for microfluidic systems include genetic, chemical, biochemical, pharmaceutical, biomedical, chromatography, IC cooling, ink-jet printer head, medical, radiological, environmental, as well as any devices that require liquid or gas filled cavities for operation. Such application may involve processes related to analysis, synthesis and purification. The medical applications include diagnostic and patient management such as implanted drug dispensing systems. The environmental applications include detecting hazardous materials or conditions such as air or water pollutants, chemical agents, biological organisms or radiological conditions. The genetic applications include testing and/or analysis of DNA.

Examples of microfluidic systems, constructed using MEMS technology, are disclosed in U.S. Pat. No. 5,962,081 (Ohman, et al.), U.S. Pat. No. 5,971,355 (Biegelsen, et al.), U.S. Pat. No. 6,048,734 (Burns, et al.), U.S. Pat. No. 6,056,269 (Johnson, et al.), U.S. Pat. No. 6,073,482 (Moles), U.S. Pat. No. 6,106,245 (Cabuz), U.S. Pat. No. 6,109,889 (Zengerle, et al.), U.S. Pat. No. 6,227,809 (Forster, et al.), U.S. Pat. No. 6,227,824 (Stehr), U.S. Pat. No. 6,126,140 (Johnson, et al.), U.S. Pat. No. 6,136,212 (Mastrangelo, et al.), U.S. Pat. No. 6,143,248 (Kellogg, et al.), and U.S. Pat. No. 6,265,758 (Takahashi), and in a technical paper entitled "Preliminary Investigation of Micropumping Based On Electrical Control Of Interfacial Tensions," by Hirofumi Matsumoto and James E. Colgate, of the Department of Mechanical Engineering at Northwestern University, Evanston, Ill., IEEE, 1990, pages 105–110, CH2832-4/90/0000-0105. Examples of systems, constructed using electrowetting and surface tension, are disclosed in a technical paper entitled "Dynamics of Electrowetting Displays," by G. Beni and M. A. Tenan, of Bell Laboratories, Holmdel, N.J., J. Appl. Phys. 52(10), October 1981, pages 6011–6015, 0021-8979/81/106011-05, and U.S. Pat. No. 4,417,786 (Beni, et al.), respectively.

In a microfluidic system, microfluidic valves control the flow of the fluid through the channels or between the other microfluidic components, such as the reservoirs, mixers, pumps, and chambers. Microfluidic valves have been constructed using actuation methods such as electrostatic, magnetic, piezoelectric, bimorph, thermo pneumatic, and pressure sensitive capillary forces. For example, U.S. Pat. No. 6,143,248 (Kellogg, et al.) discloses a microfluidic valve that uses rotationally induced fluid pressure to overcome capillary forces between the fluid and the microfluidic component. Fluids which completely or partially wet the material of the microfluidic component which contains them experience a resistance to flow when moving from a microfluidic component having a small cross-section to one having a large cross-section, while those fluids which do not wet these materials resist flowing from microfluidic components having a large cross-section to those with a small cross-section. This capillary pressure varies inversely with the sizes of the adjacent microfluidic components, the surface tension of the fluid, and the contact angle of the fluid on the material of the microfluidic component. By varying the intersection shapes, materials and cross-sectional areas of the microfluidic components, the valve is made to induce fluid flow for a particular pressure on the fluid for a particular application. However, the operation of this microfluidic component is dependent upon an external rotational force to change the pressure of the fluid induced on the microfluidic component. In some microfluidic applications, it would be desirable to have a microfluidic valve that actively controls fluid flow in a microfluidic system, having a relatively constant fluid pressure.

Accordingly, there is a need for a microfluidic valve that actively controls fluid flow in a microfluidic system, having a relatively constant fluid pressure, based on a change in the capillary and entry resistance forces between the fluid and the valve.

SUMMARY OF THE INVENTION

A valve is adapted to control the flow of the fluid in a microfluidic system. The valve includes an input port adapted to receive a fluid exerting a predetermined level of pressure on the valve and an output port adapted to provide the fluid. The valve further includes a tubular body having a variable sized aperture therein adapted to vary between a first aperture size and a second aperture size, larger than the first aperture size. The first aperture prevents the flow of the fluid through the valve responsive to a first level of capillary forces between the fluid and the valve body at the first aperture. The second aperture permits the flow of the fluid through the valve responsive to a second level of capillary forces, less than the first level of capillary forces, between the fluid and the valve in the second aperture.

These and other aspects of the present invention are further described with reference to the following detailed description and the accompanying figures, wherein the same reference numbers are assigned to the same features or elements illustrated in different figures. Note that the figures may not be drawn to scale. Further, there may be other embodiments of the present invention explicitly or implicitly described in the specification that are not specifically illustrated in the figures and vise versa.

DETAILED DESCRIPTION OF THE PREFERRED EMBODIMENTS

Figure 1:
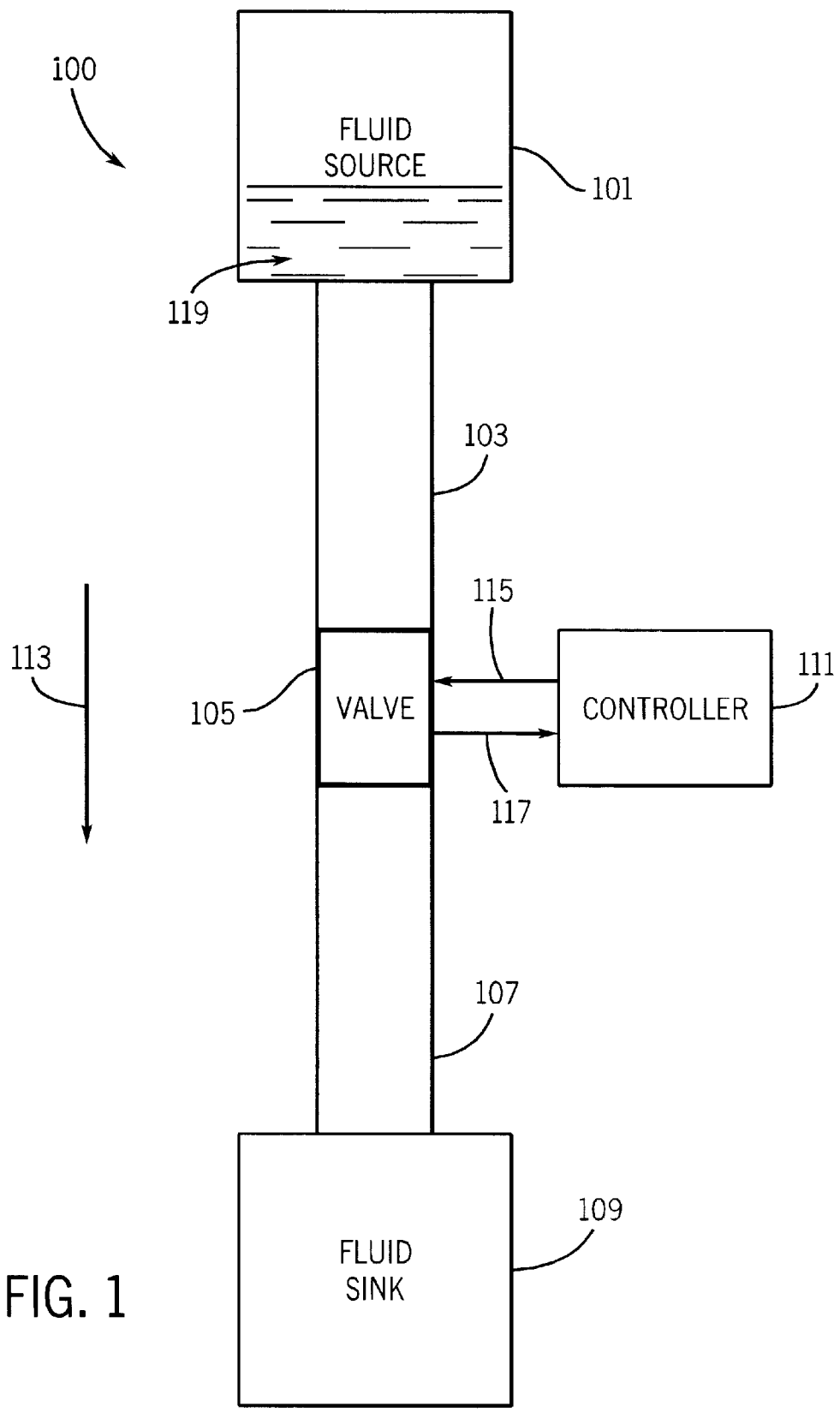
FIG. 1 illustrates a microfluidic system in accordance with a preferred embodiment of the present invention.

FIG. 1 illustrates a microfluidic system 100 in accordance with a preferred embodiment of the present invention. The microfluidic system 100 is constructed using the MEMS technology described above. The microfluidic system 100 generally includes a fluid source 101, an upstream channel 103, a valve 105, a downstream channel 107, a fluid sink 109, a controller 111 and fluid 119. The fluid source 101 is fluidly connected to the fluid sink 109 through the upstream channel 103 and the downstream channel 107. The direction of fluid flow 113 in the microfluidic system 100 is from the fluid source 101 to the fluid sink 109. The valve 105 regulates the flow of the fluid 119 from the fluid source 101 to the fluid sink 109 responsive to a control signal 115 from the controller 111. The valve 105 has an input port (not numbered) fluidly connected to the upstream channel 103 and an output port (not numbered) fluidly connected to the downstream channel 107. The valve 105 may control the fluid flow between two microfluidic components. Preferably, the valve 105 controls the fluid flow between the upstream channel 103 and the downstream channel 107. Alternatively, the valve 105 may control the fluid flow between the fluid source 101 and a channel 103.

The fluid source 101 contains the fluid 119 and generally represents any of the microfluidic components described above, including but not limited to reservoirs, mixers, and chambers. Similarly, the fluid sink 109 receives the fluid 119 and generically represents any of the microfluidic components described above.

The upstream channel 103 and the downstream channel 107 carry the fluid 119 between the fluid source 101 and the fluid sink 109. The upstream channel 103 and the downstream channel 107 may be formed as two separate channels connected by the valve 105 or as one integral channel having the valve 105 disposed therein. The fluid 119 flows from the fluid source 101 to the fluid sink 109 responsive to pressure exerted on the fluid 119. The pressure exerted on the fluid 119 may be supplied from an external source or an internal source relative to the microfluidic system 100. Examples of the external source of pressure include, without limitation, gravity and rotating mechanisms. An example of the internal source of pressure includes, without limitation, a pump. Preferably, the pump is a component of the microfluidic system 100.

The controller 111 may be constructed as an integrated circuit or as discrete circuits. The controller 111 may operate responsive to a software program or predetermined circuit design parameters. Preferably, the controller 111 is an integrated circuit operating in response to a predetermined set of instructions embodied within a software program. The controller 111 may have internal or external memory, such as RAM and/or ROM.

The controller 111 generates the control signal 115 to control the valve 105. The valve 105 opens and closes at a particular rate, at a particular distance, and/or at a particular time to regulate the flow of fluid through the valve 105. Hence, the controller 111 in combination with the control signal 115 actively controls the operation of the valve 105.

A feedback signal 117 is coupled between any microfluidic component, such as the valve 105, and the controller 111. The feedback signal 117 provides a mechanism for the controller to monitor the operation of the microfluidic system 100 for purposes of adjusting the control of the valve 105 via the control signal 115.

The fluid 119 may have any appropriate state that permits fluid flow, such as a liquid state or a gas state. The fluid 119 represents any composition of matter appropriate for applications of the microfluidic system 100 as described above. Examples of fluids 119 include, without limitation, chemical, bodily, hazardous, biological, and radiological fluids. Biological fluids may be any biologically derived analytical sample, including, without limitation, blood, plasma, serum, lymph, saliva, tears, cerebrospinal fluid, urine, sweat, semen, and plant and vegetable extracts.

The microfluidic system 100 in FIG. 1 represents a relative simple system for the sake of clarity. In practice, the microfluidic system 100 may be a very complex system having many and/or duplicated microfluidic components, such as multiple valves 105. The microfluidic system 100, performing complex or parallel functions, typically needs many valves, such as greater than ten valves, to control the transport of fluids throughout different parts of the microfluidic system 100 at the same time or different times. In such a complex microfluidic system 100 each of the valves 105 may require an independently operated actuator to actively control the valves 105 at the appropriate time. Therefore, it is desirable for the valves 105 and their actuators to be compact, reliable, simple to fabricate, and easily integrated with the rest of the microfluidic system 100.

Figure 2:
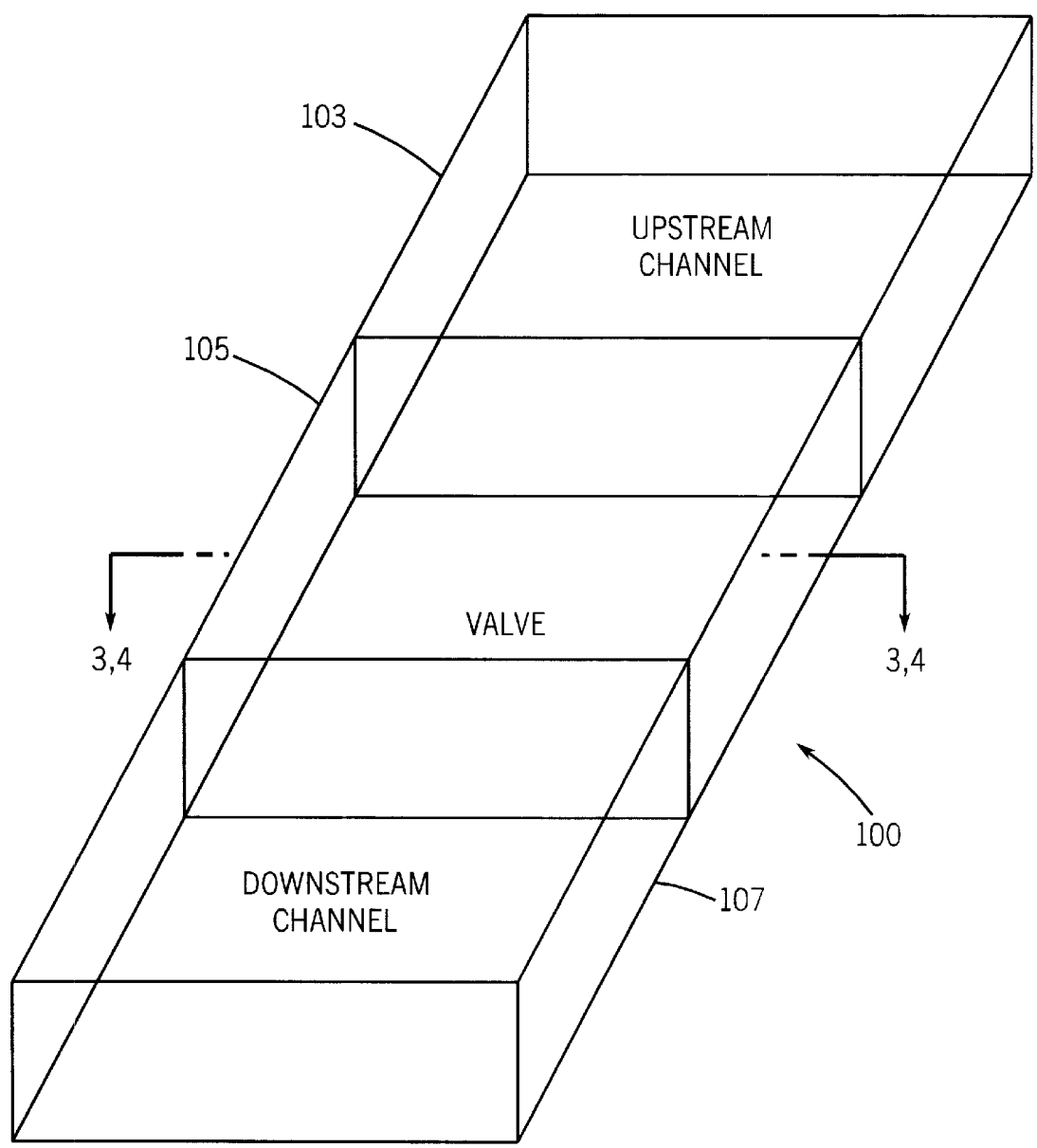
FIG. 2 illustrates the upstream channel, the valve, and the downstream channel of the microfluidic system of FIG. 1.

FIG. 2 illustrates the upstream channel 103, the valve 105, and the downstream channel 107, as shown in FIG. 1, in accordance with the preferred embodiment of the present invention. Preferably, the valve 105 has a parallelepiped shape forming a six-faced polyhedron all of whose faces are parallelograms lying in pairs of parallel planes. Preferably, the valve 105 has a rectangular cross-section disposed perpendicular to the flow of the fluid through the valve. Preferably, the upstream channel 103 and the downstream channel 107 also have the same shape, at least where the two channels are connected to the valve 105, to facilitate convenient and appropriate mechanical coupling to the valve 105. Alternatively, the upstream channel 103, the valve 105, and the downstream channel 107 may have any appropriate shape, such as round, oval, semicircular, cylindrical, and the like, compatible with MEMS construction techniques and suitable for the particular application.

Figure 3:
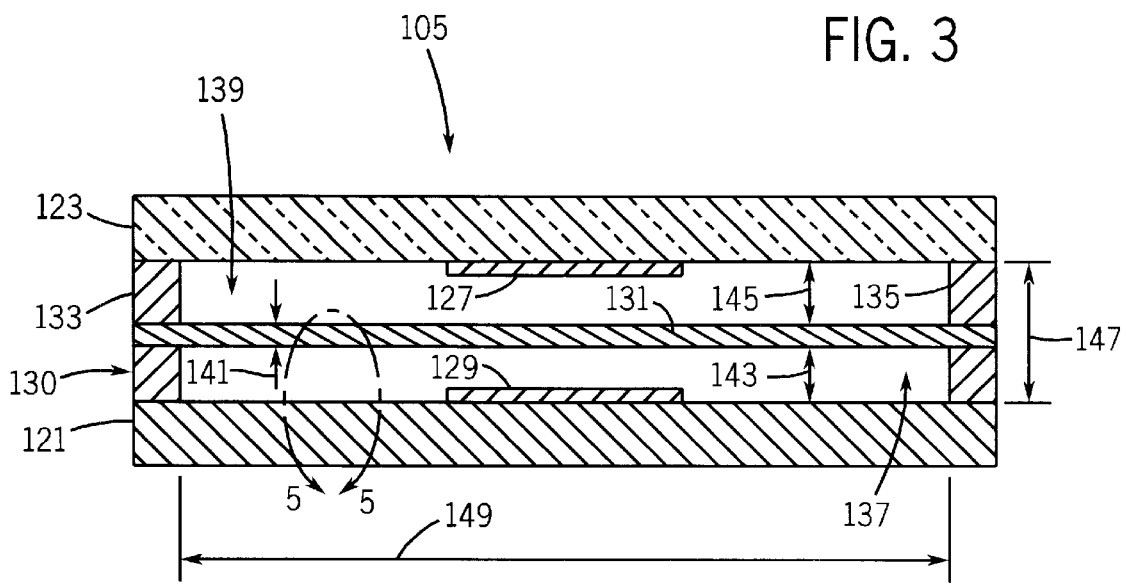
FIG. 3 illustrates a cross-sectional view of the valve, taken along line 3—3 in FIG. 2, with a diaphragm located in a neutral position to provide a small aperture.

FIG. 3 illustrates a cross-sectional view of the valve 105, as shown in FIG. 2, with a diaphragm 131 located in a neutral position to provide a small aperture 139 in accordance with the preferred embodiment of the present invention. The valve 105 includes a first, lower substrate 121, a second, upper substrate 123, a first contact 127, a second, alternate contact 129, and a bridge element 130. The bridge element 130 includes the diaphragm 131, a first sidewall 133 and a second sidewall 135. The bridge element 130 generally has an H-shaped configuration in the cross-sectional view of FIG. 3.

The cross-sectional view of the valve 105 generally has a rectangular shape. The bridge element 130 is disposed between the first, lower substrate 121 and the second, upper substrate 123 in a sandwich configuration. The first sidewall 133 and the second sidewall 135 are located at opposite ends of the diaphragm 131. The diaphragm 131 is located midway along each of the first sidewall 133 and the second sidewall 135. In the preferred embodiment of the present invention, the height 147 of the first sidewall 133 and the second sidewall 135 is two to fifteen micrometers, and is more preferably 3.3 micrometers.

The first contact 127 is disposed on a bottom surface (not numbered) of the second, upper substrate 123 and located midway between the first sidewall 133 and the second sidewall 135. Similarly, the second, alternate contact 127 is disposed on a top surface (not numbered) of the first, lower substrate 121 and located midway between the first sidewall 133 and the second sidewall 135. The thickness (not numbered) of each of the first contact 127 and the second, alternate contact 129 is relatively thin compared to the thickness 141 of the diaphragm 131. In the preferred embodiment of the present invention, the thickness 141 of the diaphragm 131 is in the range of two to five micrometers, and is preferably two micrometers.

A first, lower area 137 below the diaphragm 131 is created by a first, lower distance 143, extending between a bottom surface (not numbered) of the diaphragm 131 and a top surface (not numbered) of the first, lower substrate 121, multiplied by a length 149 of the diaphragm 131, extending between the first sidewall 133 and the second sidewall 135. Similarly, a first, upper area 139 above the diaphragm 131 is created by a first, upper distance 145, extending between a top surface (not numbered) of the diaphragm 131 and a bottom surface (not numbered) of the second, upper substrate 123, multiplied by the length 149 of the diaphragm 131, extending between the first sidewall 133 and the second sidewall 135. In the preferred embodiment of the present invention, the first, lower distance 143 and the second, upper distance 145 are each in the range of 0.5 to 5 micrometers, and are each preferably 0.65 micrometers. In the preferred embodiment of the present invention, the length 149 of the diaphragm 131 is in the range of 5 to 50 micrometers and is preferably 40 micrometers. Hence, the length 149 of the diaphragm 131 is relatively long as compared to the height 147 of the sidewalls 133 and 135, the thickness 141 of the diaphragm 131, and the height 143 and 145 of the areas 137 and 139, respectively. Note that the calculation of the first, lower area 137 and the first, upper area 139 ignores the reduction of each area due to the first contact 127 and the second, alternate contact 129, respectively, because the reduction is minimal compared to each area.

The depth (not numbered) of the valve 105 is in the range of 5 to hundreds of micrometers, and is preferably 100 micrometers. The longer the depth of the valve 105, a larger surface area of the diaphragm is exposed to the fluid to cause increased surface tension between the fluid 119 and the valve 105.

Figure 4:
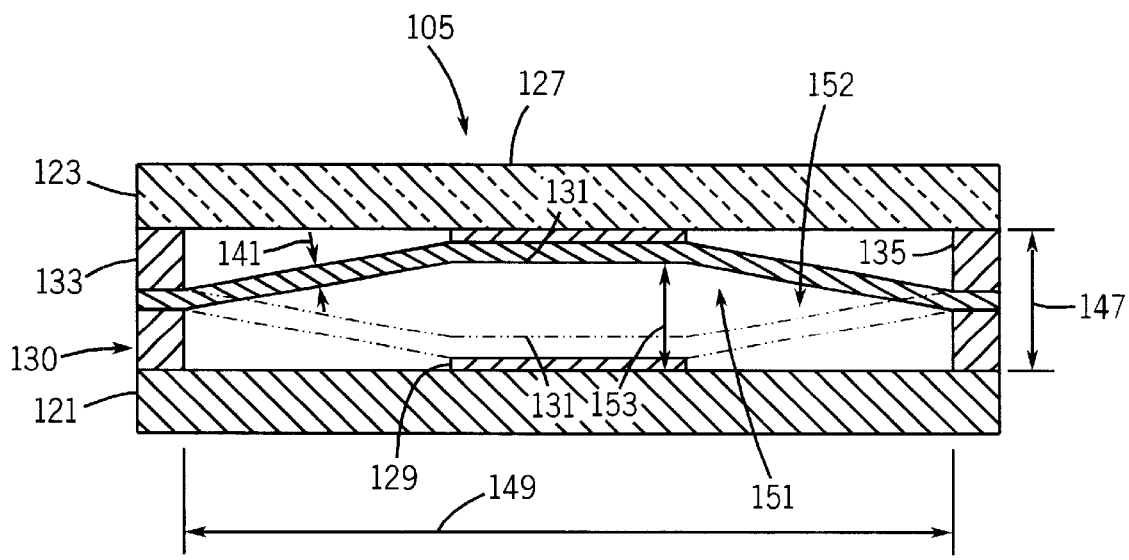
FIG. 4 illustrates a cross-sectional view of the valve, taken along line 4—4 as shown in FIG. 2, with the diaphragm located in a biased position to provide a large aperture.

FIG. 4 illustrates a cross-sectional view of the valve 105, as shown in FIG. 2, with the diaphragm 131 located in a biased position to provide a relatively large aperture 151 in accordance with the preferred embodiment of the present invention. The diaphragm 131 has an appropriate thickness 141, material and construction to permit the diaphragm 131 to move towards and against either one of the first contact 127 and the second, alternate contact 129. The movement of the diaphragm 131 may otherwise be described as bowing, flexing, stretching, biasing, actuating and the like. Preferably, the diaphragm 131 makes physical contact with either the first contact 127 or the second, alternate, contact 129 when the diaphragm 131 is moved. Alternatively, the diaphragm 131 may not physically contact either the first contact 127 or the second, alternate, contact 129 when the diaphragm 131 is moved.

Preferably, the diaphragm 131 moves between the neutral, unbiased position, as shown in FIG. 3, and the biased position, towards and against the first contact 127, as shown in FIG. 4. When the diaphragm is biased towards and against the first contact 127, the first, lower area 137 below the diaphragm 131, as shown in FIG. 3, increases to a second, lower area 151 having a second, lower distance 153, extending between the bottom surface (not numbered) of the diaphragm 131 and the top surface (not numbered) of the first, lower substrate 121, at the center portion of the diaphragm 131. In the preferred embodiment of the present invention, the second, lower distance 153 is 1.30 micrometers. Hence, the second, lower distance 153 is preferably twice as high as the first, lower distance 143.

Alternatively, the diaphragm 131 moves between the neutral, unbiased position, as shown in FIG. 3, and the biased position, towards and against the second, alternate, contact 129, as shown in FIG. 4. When the diaphragm is biased towards and against the second, alternate contact 129, the second, upper area 139 above the diaphragm 131, as shown in FIG. 3, increases to a second, upper area 152 having a second, upper distance (not numbered, but equal to the second lower distance 153), extending between the top surface (not numbered) of the diaphragm 131 and the bottom surface (not numbered) of the second, upper substrate 123, at the center portion of the diaphragm 131.

The second, alternate, contact 129 may be used instead of the first contact 127 or in combination with the first contact. When the second, alternate contact 129 is used instead of the first contact 127, the diaphragm 131 is biased in a downward direction towards and against the second, alternate, contact 129 rather than in an upward direction towards and against the first contact 127. When the second, alternate contact 129 is used in combination with the first contact 127, the diaphragm 131 may be alternately or periodically biased in a downward direction towards and against the second, alternate, contact 129 and in an upward direction towards and against the first contact 127. Biasing the diaphragm 131 in one direction or two directions may permit the diaphragm to have longer life and/or faster response times depending on engineering design factors such as the thickness 141, material and construction of the valve 105.

In the preferred embodiment of the present invention, diaphragm 131 moves between the neutral, unbiased position, as shown in FIG. 3, and the biased position, towards and against the first contact 127, as shown in FIG. 4, responsive to electrostatic forces. Preferably, the first contact 127 and/or the second, alternate contact 129 each has a first electrical potential and the diaphragm 131 has a second electrical potential. Preferably, the first electrical potential is a positive electrical potential and the second electrical potential is a negative electrical potential. The positive electrical potential is applied to the first contact 127 and/or the second, alternate, contact 129 by the controller 111 via the control signal 115. The negative electrical potential is applied to the diaphragm 131 via the controller 111 or other source. Preferably, the negative electrical potential is constantly applied to the diaphragm 131, and the positive electrical potential is applied to the first contact 127 and/or the second, alternate, contact 129 when needed to move the diaphragm 131. The positive electrical potential, applied to the first contact 127 and/or the second, alternate, contact 129, attracts the negative electrical potential, applied to the diaphragm 131, to cause the diaphragm 131 to move towards and against the first contact 127 and/or the second, alternate contact 129. Alternatively, the positive and negative electrical potentials on the respective elements of the valve 105 may be reversed to achieve the same result. Alternatively, the electrical potentials on the respective elements of the valve 105 may be the same, i.e., either positive or negative, to cause the diaphragm 131 to be repelled away from the first contact 127 and/or the second, alternate contact 129 to cause the diaphragm 131 to move. Still alternatively, the diaphragm 131 may be moved using other mechanisms including, without limitation, magnetic, piezoelectric, bimorph, shape memory alloy, and thermo-pneumatic.

In the preferred embodiment of the present invention, the first, lower area 137, providing a small aperture, prevents the flow of fluid 119 through the valve 105 due to increased capillary forces between the fluid 119 and the valve 105. The second, lower area 151, providing a large aperture, permits the flow of fluid 119 through the valve 105 due to reduced capillary forces between the fluid 119 and the valve 105. The valve 105 may be otherwise be considered a capillary microvalve due to the change in the capillary forces between the fluid 119 and the valve 105 in the variable sized aperture responsive to the movement of the diaphragm 131. The valve 105 provides starting and stopping of fluid flow, precise metering of fluid flow, and fluid partitioning wherein particulates are concentrated prior to release.

Figure 5:
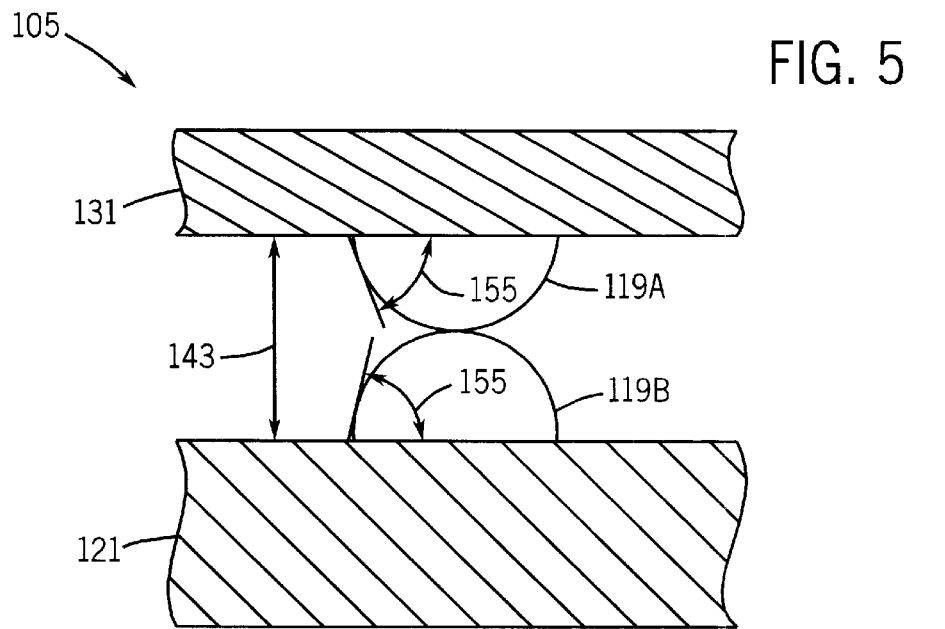
FIG. 5 illustrates a magnified cross-sectional view of the valve, from the area designated 5—5 in FIG. 3, with the diaphragm being located in a neutral position to provide the small aperture.

FIG. 5 illustrates a magnified cross-sectional view of the valve 105, as shown in FIG. 3, with the diaphragm 131 located in the neutral position to provide the first, lower area 137 forming the small aperture in accordance with the preferred embodiment of the present invention. The fluid 119 is magnified at a microscopic level and depicted as two bubbles 119A, 119B. One bubble 119A of the fluid adheres to the diaphragm 131 and the other bubble 119B adheres to the first, lower substrate 121. The first, lower area 137 forming the small aperture is sized appropriately so that the capillary forces between the fluid 119 and the valve 105 prevent the flow of fluid 119 through the valve 105 when the diaphragm 131 is located in the neutral position.

Fluids can be characterized by interactions with solid substrates and gasses. These interactions include interfacial tension, or the energy per unit area at the interface of the fluid 119 with another substance, such as the valve 105. One effect of the interfacial tension is capillary action. Fluids resist flow through a small area due to increased capillary action between the fluid 119 and the valve 105. Changing the cross-sectional area in the path of the flow of fluid 119 permits the flow of the fluid 119 to be regulated. Design considerations for this type of valve 105 include factors such as the size and shape of the cross-sectional area of fluid flow, material and surface characteristics of the valve 105, the characteristics of the fluid 119, the pressure exerted on the fluid 119, etc. These design considerations determine the fluid surface tension and interfacial energy of the interface between the fluid 119 and the valve 105.

The capillary forces arise due to the effects of interfacial energy, which is the energy of interactions between materials. In the preferred embodiment of the present invention, the interfacial energy is between fluids, especially liquids, and solid materials, such as the valve 105. When a contact angle 155 is greater than 90 degrees, the liquid does not wet the solid and beads on the solid surface. When a contact angle 155 is less than 90 degrees, the liquid wets the solid and spreads onto the solid surface. For a given fluid 119, the contact angle 155 is determined by the size and shape of the cross-sectional area of fluid flow, the material and surface characteristics of the valve 105, the pressure exerted on the fluid 119 to either permit or inhibit fluid flow.

MicroSensors: Principles and Applications, authored by Julian Gardner and published by Wiley and Sons in 1994, pages 167–169 and Fluid Mechanics, authored by F. M. White and published by McGraw Hill in 1986, page 306 both disclose the following equation related to fluid flow:

Flow=$R^4$(p1–p2)/(8 L), wherein:
R=radius of tube,
p1–p2=pressure drop,
=viscosity of the fluid, and
L=length of the fluid channel.

The cross sectional area A of the value 105 is rectangular rather than circular, but the above equation provides good relative flow approximations when the diaphragm-substrate separation distances 143, 145, or 153 are substituted for the radius R. In a case where the fluid source is a hanging IV bag and the fluid sink is a patient, the pressure drop p1–p2 is essentially constant and the design of the value to provide a specific flow rate becomes straightforward to someone skilled in the art.

Figure 6:
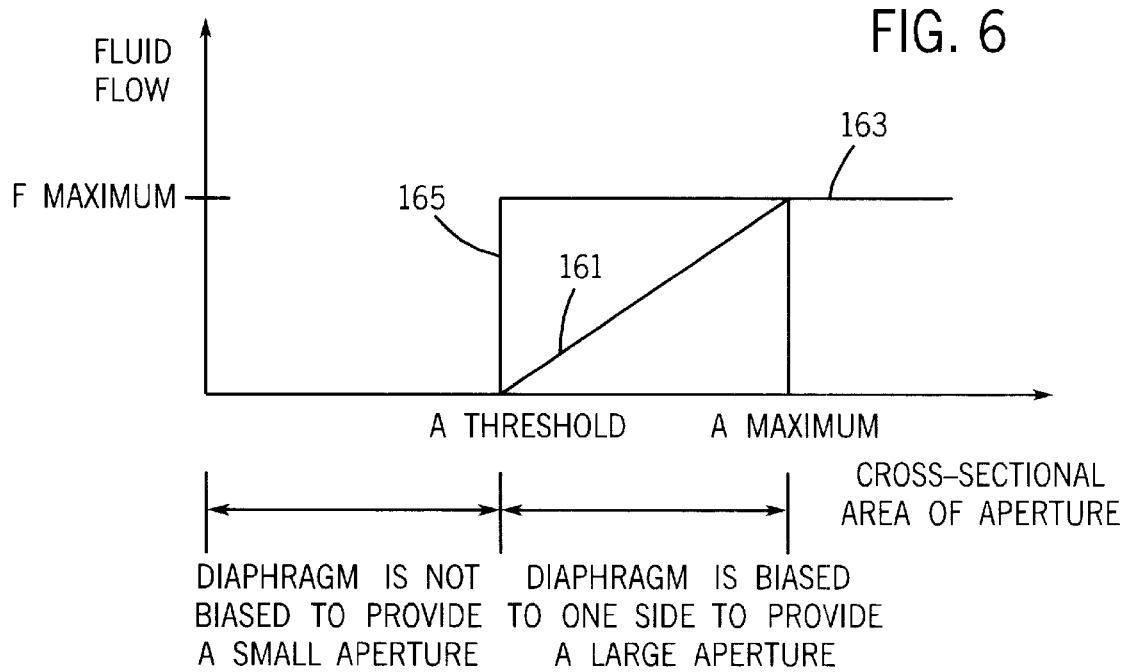
FIG. 6 illustrates a graph plotting the cross-sectional area of the aperture of the valve versus the fluid flow through the valve of FIGS. 1–4.

FIG. 6 illustrates a graph plotting the cross-sectional area of the aperture A of the valve 105 versus the fluid flow F through the valve 105 in accordance with the preferred embodiment of the present invention. When diaphragm 131 is in its neutral, unbiased position, as shown in FIG. 3, the first, lower area 137, providing the small aperture, prevents the flow of fluid 119 through the valve 105 due to high capillary forces between the fluid 119 and the valve 105. In this position, the cross-sectional area of the first, lower area 137, providing the small aperture, is less than a predetermined cross-sectional area threshold where fluid flow begins.

When the diaphragm 131 is biased to one side or the other, as shown in FIG. 4, the second, area 151 or 152, providing the large aperture, permits the flow of fluid 119 through the valve 105 due to reduced capillary forces between the fluid 119 and the valve 105. In this case, the cross-sectional area of the second, area 151 or 152, providing the large aperture, is greater than the cross-sectional area threshold where fluid flow begins. The farther the diaphragm 131 is moved to one side, the larger the second, area 151 or 152, providing the large aperture, becomes until it reaches a maximum cross-sectional area. As the second area 151 or 152 defining, the aperture increases, the capillary forces have less of an effect, thereby permitting the fluid flow to increase, as represented by the line 161. Although the line 161 is shown as linear, it may have other shapes such as parabolic or exponential, depending on the design of the valve 105. When the diaphragm 131 is moved very quickly to one side so as to form a second, area 151 or 152, with the maximum cross-sectional area, the fluid flow approximates a step function, as represented by line 165. At the maximum cross-sectional area, the fluid flow through the valve 105 reaches a maximum level, as represented by line 163.

Figure 7:
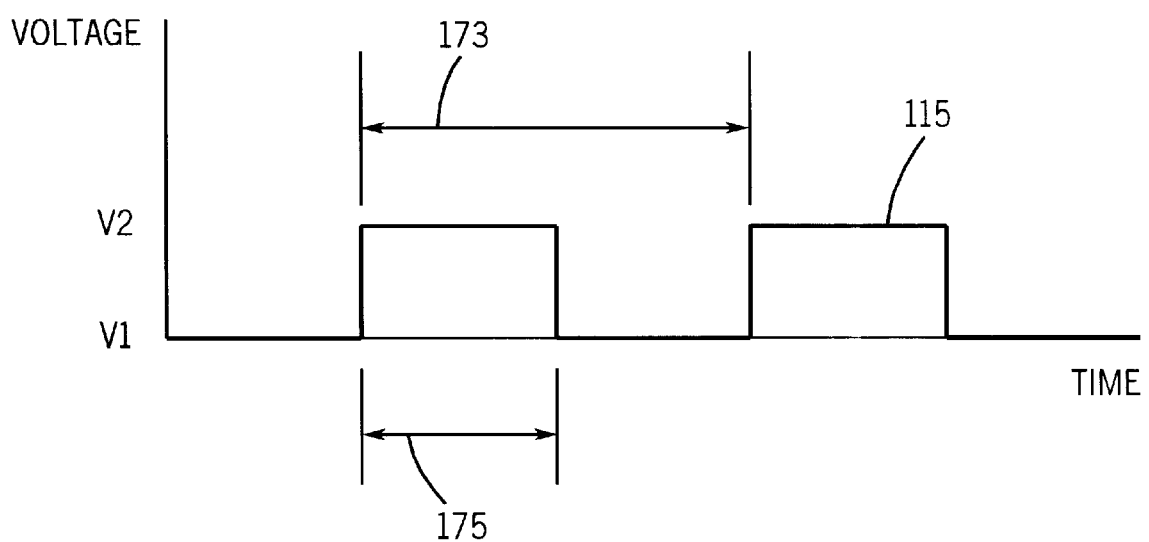
FIG. 7 illustrates a control signal for controlling the valve in accordance with one embodiment of the present invention.

FIG. 7 illustrates the control signal 115 for controlling the valve 105 in accordance with one preferred embodiment of the present invention. The control signal 115 is shown as a digital pulse signal having a duty cycle 173, a pulse width 175, a high voltage level V2 and a low voltage level V1. The pulse width 175 corresponds to the duration that the control signal 115 generates the high voltage level V2. Preferably, V1 equals 0 volts and V2 equals 5 volts. When the control signal 115 generates the low voltage level V1, the diaphragm 131 is in its neutral, unbiased position, as shown in FIG. 3. The first, lower area 137, providing a small aperture, prevents the flow of fluid 119 through the valve 105. The longer the low voltage level V1 is present, the longer the diaphragm 131 stays in its neutral position and the longer fluid 119 does not flow through the valve 105. When the control signal 115 generates the high voltage level V2, the diaphragm 131 is biased to one side, as shown in FIG. 4. The second, area 151, providing a large aperture, permits the flow of fluid 119 through the valve 105. The longer the high voltage level V2 is present, the longer the diaphragm 131 stays in its biased position and the longer fluid 119 flows through the valve 105. Hence, the digital pulses of the control signal 115 move the diaphragm 131 between its neutral and biased positions to prevent and permit, respectively, the flow of the fluid 119 through the valve 105. The controller 111 can adjust the duty cycle 173 of the control signal 115, either statically or dynamically, to adjust the flow of the fluid 119 through the valve 105. The speed of the fluid flow and the range of control of the fluid flow depends on such engineering factors such as the response time of the diaphragm 131, the pressure exerted on the fluid 119, the capillary forces, etc. Further, multiple valves, having different flow rates and connected to the fluid source 101, can be located in parallel and independently controlled by different control signals, generated by the controller, to increase the range of control of the fluid flow.

Figure 8:
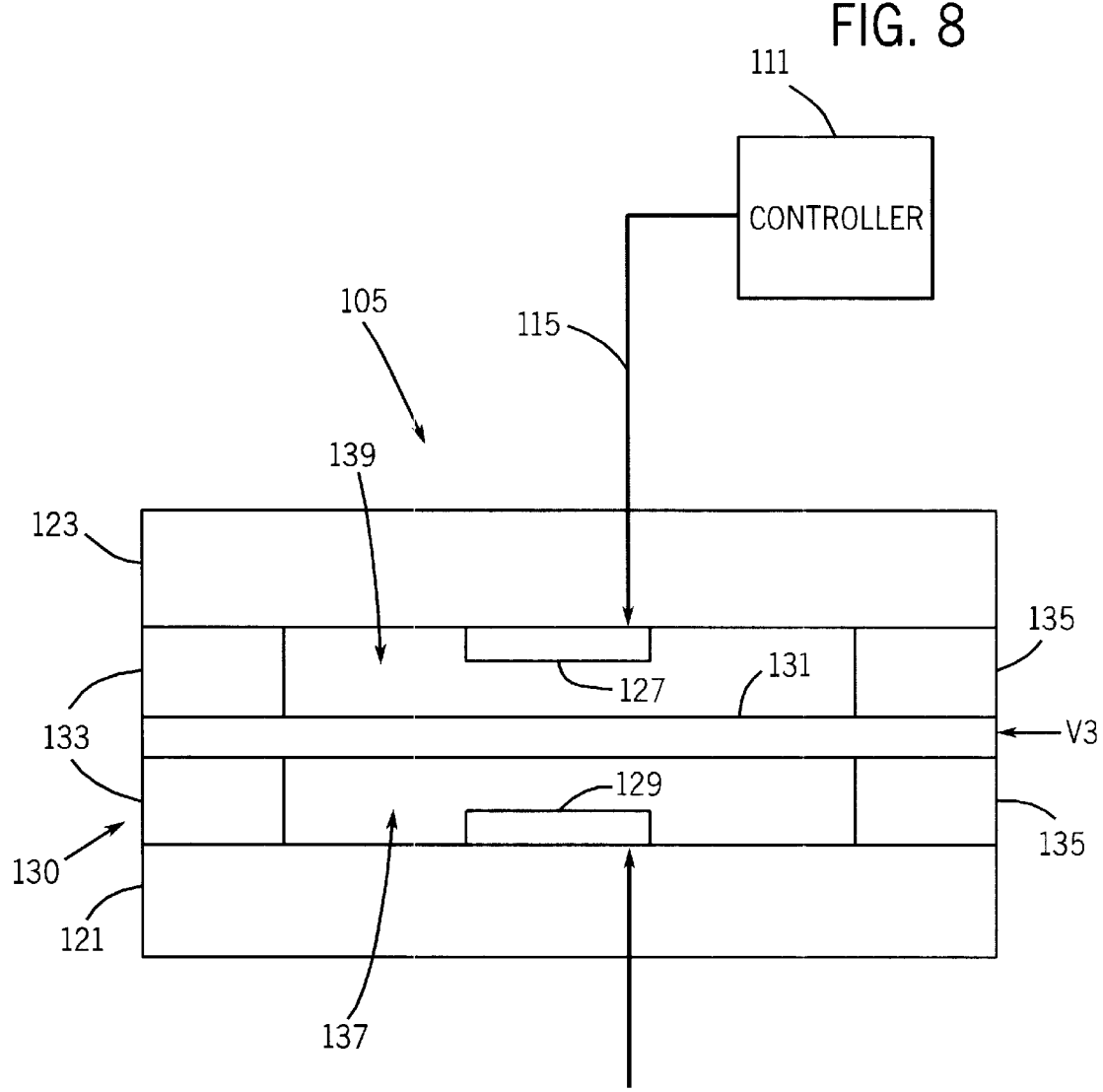
FIG. 8 illustrates a semiconductor construction for the valve of FIG. 1.

FIG. 8 illustrates a semiconductor construction for the valve 105. Preferably, the valve 105 is constructed using IC processes, as described above. The bridge element 130 may be made with typical IC material including, without limitation, silicon, polycrystalline silicon, dielectrics such as silicon dioxide and silicon nitride, polymers. Preferably, the first, lower substrate 121 is made with silicon, the second, upper substrate 123 is made with glass, the first contact 127 is made with metal, the second, alternate contact 129 is made with metal such as gold or aluminum, the diaphragm 131 is made with polycrystalline silicon, the first sidewall 133 is made with silicon dioxide, and the second sidewall 135 is made with silicon dioxide. The diaphragm 131 is made with polycrystalline silicon because this material is flexible, has a fast response time and is resistant to fatigue. A third electrical potential V3 can be applied to the diaphragm 131.

Advantages of the valve 105 include being small due to the semiconductor construction. Because of the small size and the short distance that the diaphragm 131 must move to actuate the valve 105, the valve uses minimal power. Because the diaphragm 131 moves a short distance, the response time of the valve 105 is fast and the damping effects are minimized. The low power requirement permits the controller 111 to be supplied with power from a small battery. The small size, low power requirement and fast response time of the valve permit it to be integrated into a small portable device. Such a small, portable device may be easily carried by a person or even be implanted inside a person.

Hence, while the present invention has been described with reference to various illustrative embodiments thereof, it is not intended that the invention be limited to these specific embodiments. Those skilled in the art will recognize that variations, modifications and combinations of the disclosed subject matter can be made without departing from the spirit and scope of the invention as set forth in the appended claims.

What is claimed is:

1. A valve adapted to control the flow of the fluid in a microfluidic system, the valve comprising:

an input port adapted to receive a fluid exerting a predetermined level of pressure on the valve and an output port adapted to provide the fluid, and a tubular body having a variable sized aperture adapted to vary between a first aperture size and a second aperture size, larger than the first aperture size, wherein the first aperture size prevents the flow of the fluid through the valve responsive to a first level of capillary forces between the fluid and the tubular body at the first aperture size, and wherein the second aperture size permits the flow of the fluid through the valve responsive to a second level of capillary forces, less than the first level of capillary, forces, between the fluid and the tubular body at the second aperture;

a first substrate being planar;

a second substrate being planar and disposed opposite to and parallel to the first substrate; and a bridge element disposed between and adjacent to the first substrate and the second substrate and having an H-shaped cross-section disposed perpendicular to the direction of the flow of the fluid through the valve, the bridge element including:

a first sidewall interconnecting the first substrate and the second substrate;

a second sidewall spaced from the first sidewall and interconnecting the first substrate and the second substrate;

a diaphragm being planar and having a predetermined thickness, the diaphragm being connected to and extending between the first sidewall and the second sidewall, the diaphragm being disposed between and parallel to the first substrate and the second substrate in a neutral first, unbiased position, the diaphragm being adapted to move between a first position and a second position toward one of the first substrate and the second substrate;

the valve forming a first aperture of the first aperture size disposed below the diaphragm when the diaphragm is in the first position and defining a first cross-sectional area equal to a first distance between a bottom surface of the diaphragm and a top surface of the first substrate multiplied by a length of the diaphragm that extends between the first sidewall and the second sidewall;

the valve forming a second aperture of the second aperture size disposed below the diaphragm when the diaphragm is in the second position and defining a second cross-sectional area equal to a second distance between a bottom surface of the diaphragm and a top surface of the first substrate multiplied by the length of the diaphragm that extends between the first sidewall and the second sidewall.

2. A valve according to claim 1 wherein the diaphragm is adapted to move between the first position and the second position responsive to a first control signal having a first electrical potential and a second electrical potential, respectively.

3. A valve according to claim 2 wherein the valve further comprises:

a first contact disposed on the first substrate between the first substrate and the second substrate, the first contact being electrically coupled to receive the first control signal, the diaphragm having a third electrical potential, the first electrical potential on the first contact interacting with the third electrical potential on the diaphragm to move the diaphragm to the first position, and the second electrical potential on the first contact interacting with the third electrical potential on the diaphragm to move the diaphragm to the second position.

4. A valve according to claim 1 wherein the first substrate is formed from silicon, the second substrate is formed from glass, the first sidewall and the second sidewall are each formed of silicon dioxide, and the diaphragm is formed from polycrystalline silicon.

5. A valve according to claim 1 wherein the first substrate is formed from silicon, the second substrate is formed from glass, the first sidewall and the second sidewall are each formed of silicon dioxide, and the diaphragm is formed from polycrystalline silicon.

6. A valve adapted to control the flow of the fluid in a microfluidic system, the valve comprising:

a parallelepiped shape having an input port adapted to receive a fluid exerting a predetermined level of pressure on the valve and an output port adapted to provide the fluid, and a variable sized aperture, having a rectangular cross-section disposed perpendicular to the flow of the fluid through the valve, adapted to vary between a first aperture and a second aperture, larger than the first aperture, wherein the first aperture prevents the flow of the fluid through the valve responsive to a first level of capillary forces between the fluid and the valve in the first aperture, and wherein the second aperture permits the flow of the fluid through the valve responsive to a second level of capillary forces, less than the first level of capillary forces, between the fluid and the valve in the second aperture, wherein the valve further includes:

a first substrate being planar;

a second substrate being planar and disposed opposite to and parallel to the first substrate; and a bridge element disposed between and adjacent to the first substrate and the second substrate and having an H-shaped cross-section disposed perpendicular to the direction of the flow of the fluid through the valve, the bridge element including:

a first sidewall disposed between and adjacent to the first substrate and the second substrate;

a second sidewall disposed between and adjacent to the first substrate and the second substrate;

a diaphragm being planar and having a predetermined thickness, the diaphragm being disposed between and adjacent to the first sidewall and the second sidewall, the diaphragm being disposed between and parallel to the first substrate and the second substrate, the diaphragm being adapted to move between a first position and a second position, the valve forming the first aperture disposed below the diaphragm when the diaphragm is in the first position responsive to a first distance, extending between a bottom surface of the diaphragm and a top surface of the first substrate, multiplied by a length of the diaphragm, extending between the first sidewall and the second sidewall;

the valve forming the second aperture disposed below the diaphragm when the diaphragm is in the second position responsive to a second distance, extending between a bottom surface of the diaphragm and a top surface of the first substrate, multiplied by the length of the diaphragm, extending between the first sidewall and the second sidewall, wherein the diaphragm is adapted to move between the first position and the second position responsive to a first control signal having a first electrical potential and a second electrical potential, respectively.

wherein the valve further includes:

a first contact disposed on the first substrate between the first substrate and the second substrate, the first contact being electrically coupled to receive the first control signal, the diaphragm having a third electrical potential, the first electrical potential on the first contact interacting with the third electrical potential on the diaphragm to move the diaphragm to the first position, and the second electrical potential on the first contact interacting with the third electrical potential on the diaphragm to move the diaphragm to the second position.

7. A valve according to claim 6:

wherein the valve forms a second aperture, larger than the first aperture, disposed above the diaphragm when the diaphragm is in a third position to permit the flow of the fluid through the valve responsive to a second distance, extending between the top surface of the diaphragm and the bottom surface of the second substrate, multiplied by the length of the diaphragm, extending between the first sidewall and the second sidewall;

wherein the diaphragm is adapted to move between the first position and the third position responsive to a second control signal having a first electrical potential and a second electrical potential, respectively.

8. A valve according to claim 7 wherein the valve further comprises:

a second contact disposed on the second substrate between the first substrate and the second substrate, the second contact being electrically coupled to receive the second control signal, and the first electrical potential on the second contact interacting with the third electrical potential on the diaphragm to move the diaphragm to the first position, and the second electrical potential on the second contact interacting with the third electrical potential on the diaphragm to move the diaphragm to the third position.

* * * * *

UNITED STATES PATENT AND TRADEMARK OFFICE
CERTIFICATE OF CORRECTION

PATENT NO.      : 6,561,224 B1
DATED           : May 13, 2003
INVENTOR(S)     : Steve T. Cho It is certified that error appears in the above-identified patent and that said Letters Patent is hereby corrected as shown below:

<u>Title page,</u>
Item [75], Inventor, replace "Steven T. Cho" with -- Steve T. Cho --.

<u>Column 8,</u>
Line 35, replace "/(8 L), wherein:" with -- /(8vL), wherein: --.
Line 38, replace "= viscosity" with -- v = viscosity --.

Signed and Sealed this

Thirtieth Day of September, 2003

JAMES E. ROGAN
*Director of the United States Patent and Trademark Office*